(12) United States Patent
Andoh et al.

(10) Patent No.: US 9,739,064 B2
(45) Date of Patent: Aug. 22, 2017

(54) DRAINAGE SYSTEM AND APPARATUS FOR TREATING RUNOFF

(71) Applicant: Hydro International plc, Clevedon (GB)

(72) Inventors: Robert Yaw Gyamfi Andoh, South Portland, ME (US); Jeremy Paul Lecornu, Somerset (GB); Jeremy Fink, Portland, ME (US); Kwabena Osei, South Portland, ME (US)

(73) Assignee: Hydro International Ltd, Clevedon (GB)

( * ) Notice: Subject to any disclaimer, the term of this patent is extended or adjusted under 35 U.S.C. 154(b) by 135 days.

(21) Appl. No.: 14/679,740

(22) Filed: Apr. 6, 2015

(65) Prior Publication Data

US 2015/0299990 A1    Oct. 22, 2015

Related U.S. Application Data

(60) Provisional application No. 61/980,649, filed on Apr. 17, 2014.

(51) Int. Cl.
  *E04D 13/08* (2006.01)
  *E04D 13/064* (2006.01)
  *E03B 1/04* (2006.01)

(52) U.S. Cl.
  CPC ......... *E04D 13/08* (2013.01); *E04D 13/0645* (2013.01); *E03B 1/041* (2013.01);
  (Continued)

(58) Field of Classification Search
  CPC ............... E04D 13/0645; E04D 13/08; E04D 2013/0427; E04D 2013/0833;
  (Continued)

(56) References Cited

U.S. PATENT DOCUMENTS 2,807,368 A    9/1957  Blau
4,615,153 A *  10/1986 Carey ................. E04D 13/0645
                                                                210/162

(Continued)

FOREIGN PATENT DOCUMENTS

AU    2011200482    10/2011
CN    203429923     2/2014
(Continued)

OTHER PUBLICATIONS

Search Report from U.K. Patent Office for application GB1409562.4 dated Oct. 27, 2014.
(Continued)

*Primary Examiner* — Kevin Murphy
(74) *Attorney, Agent, or Firm* — Honigman Miller Schwartz and Cohn LLP

(57) ABSTRACT

A drainage system, comprising a collector which is arranged to collect liquid and a drainage pipe having a pipe inlet that opens into the collector such that liquid collected by the collector drains through the pipe inlet. The drainage pipe is provided with a vent spaced away from the pipe inlet. The vent is arranged such that, when liquid collected by the collector occludes the pipe inlet, liquid flowing through the drainage pipe draws air into the drainage pipe through the vent.

11 Claims, 8 Drawing Sheets

(52) U.S. Cl.
CPC .. *E03B 2001/047* (2013.01); *E04D 2013/086* (2013.01); *E04D 2013/0833* (2013.01); *E04D 2013/0873* (2013.01); *Y10T 137/6969* (2015.04); *Y10T 137/8634* (2015.04); *Y10T 137/86324* (2015.04)

(58) Field of Classification Search
CPC ....... Y10T 137/6969; Y10T 137/86324; Y10T 137/8634
See application file for complete search history.

(56) References Cited

U.S. PATENT DOCUMENTS

| | | | | |
|---|---|---|---|---|
| 5,406,966 | A | * | 4/1995 | Lepkowski ............... B08B 3/02 134/104.4 |
| 5,799,445 | A | * | 9/1998 | Kock ................. E04D 13/0645 52/11 |
| 5,873,383 | A | | 2/1999 | Takai et al. |
| 8,286,390 | B2 | * | 10/2012 | Leahy ................. E04D 13/0645 52/11 |
| 8,864,180 | B2 | * | 10/2014 | Harman .................. E04D 13/08 285/146.1 |

FOREIGN PATENT DOCUMENTS

| | | |
|---|---|---|
| EP | 0825304 A2 | 2/1998 |
| JP | 2002336839 A | 11/2002 |
| JP | 2007016817 | 1/2007 |
| KR | 100896056 B1 | 5/2009 |
| KR | 20100123189 A | 11/2010 |

OTHER PUBLICATIONS

Search Report from U.K. Patent Office for application GB1409562.4 dated Mar. 30, 2015.

* cited by examiner

DRAINAGE SYSTEM AND APPARATUS FOR TREATING RUNOFF

CROSS-REFERENCE TO RELATED APPLICATIONS

The present application claims priority to U.S. Provisional Application No. 61/980,649 filed on 17 Apr. 2014, which is hereby incorporated by reference in its entirety for any and all purposes.

BACKGROUND

This invention relates to a drainage system, such as a drainage system for a roof, and an apparatus for treating runoff, such as rainwater runoff from a roof.

Drainage systems for roofs are well known. Typically, a gutter is provided at an edge of the roof for collecting rain which has fallen onto the roof. The gutter is connected to a downpipe which extends downwardly from the gutter.

When it rains, water which has fallen on the roof runs off the roof and collects in the gutter. The collected water flows along the gutter and drains through the downpipe. During a heavy downpour, the level of water collected within the gutter increases. As the level of water increases, the flow rate exceeds the flow capacity of the downpipe. Inlet flow through the downpipe inlet therefore undergoes a transition from a partial flow condition in which air is drawn in through the downpipe inlet and entrained within the water along the downpipe to a full flow condition in which no air is drawn through the downpipe inlet.

During this transition, air trapped within the downpipe as the flow rate increases is forced back through the pipe inlet, which causes glugging. Glugging causes the downpipe and associated structure to vibrate: a phenomenon often referred to as water hammer. The vibration is undesirable since it causes noise and can damage the drainage system or cause it to detach from the roof/building to which it is secured.

A further problem associated with existing drainage systems is that the long drop provided by the downpipe causes water to exit the downpipe at a high velocity. The high velocity water can damage downstream components, such as drainage pipes of treatment vessels. Consequently, the length, diameter and/or orientation of the downpipe is often constrained by the need to maintain an acceptable flow rate that will not damage components situated at the outlet of the downpipe.

SUMMARY

According to a first aspect of the invention there is provided a drainage system, comprising: a collector which is arranged to collect liquid; and a drainage pipe having a pipe inlet that opens into the collector such that liquid collected by the collector drains through the pipe inlet, wherein the drainage pipe is provided with a vent spaced away from the pipe inlet, the vent being arranged such that, when liquid collected by the collector occludes the pipe inlet, liquid flowing through the drainage pipe draws air into the drainage pipe through the vent.

The drainage system may further comprise a vent duct which extends away from the vent, the vent duct having a vent inlet arranged to draw air from a level above the pipe inlet during normal use, and a vent outlet which opens into the drainage pipe through the vent. The vent inlet may be arranged to open into the collector.

The vent inlet may be arranged such that in use, a threshold level of liquid which accumulates within the collector inhibits flow of air through the vent inlet.

The vent inlet may comprise an aperture which is located in a plane inclined to the horizontal such that flow of air through the vent inlet is progressively inhibited as the level of liquid within the collector rises over the aperture.

The collector may comprise an overflow disposed at a level above the vent, for example above the vent inlet. The drainage pipe may comprise a downpipe having a downwardly extending portion.

The downpipe may comprise a tapered portion which is arranged to taper in the direction away from the pipe inlet. The downpipe may further comprise a substantially longitudinally extending exit portion disposed between the pipe inlet and the downwardly extending portion. The drainage pipe may comprise a curved portion disposed between the pipe inlet and the downwardly extending portion, wherein the vent is disposed at the curved portion.

The pipe inlet may be arranged to open into the collector through a sidewall of the collector.

The drainage system may further comprise an energy dissipater, the energy dissipater being disposed in fluid communication with the drainage pipe. The collector may comprise a longitudinally extending gutter.

According to a second aspect of the present invention there is provided a building comprising a drainage system in accordance with the first aspect of the invention, wherein the collector is arranged to collect runoff from the building.

According to a third aspect of the present invention there is provide an apparatus for treating runoff, comprising: a downpipe having a downpipe inlet and a downpipe outlet; a treatment vessel; and an energy dissipater disposed within the treatment vessel such that, in normal use, the energy dissipater is submerged by liquid which accumulates within the treatment vessel, the energy dissipater comprising a substantially cylindrical dissipation chamber having a dissipater inlet provided in fluid communication with the downpipe outlet, and a dissipater outlet arranged to discharge fluid into the treatment vessel, wherein the energy dissipater is configured to promote rotational flow of liquid entering the dissipation chamber through the dissipation inlet.

The dissipater inlet may be arranged to promote rotational flow of liquid entering the dissipation chamber. The dissipater inlet may be arranged to discharge fluid into the dissipation chamber in a tangential direction.

The dissipation chamber may comprise a tube, an open end of which provides a dissipater outlet. Both ends of the tube may be open, each end providing a dissipater outlet.

The energy dissipater may be suspended within the treatment vessel by the downpipe.

The treatment vessel may comprise a collection chamber and a drainage chamber which has a drain outlet, wherein the collection chamber and the separation chamber are separated by a baffle which defines a weir such that liquid which collects in the collection chamber above the level of the weir flows over the weir and is discharged from the treatment vessel through the drain outlet.

A vortex valve may be disposed at the drain outlet to control flow through the drain outlet. The apparatus may further comprise an overflow disposed within the collection chamber.

The apparatus may further comprise a drainage valve provided at a lower region of the collection chamber which can be opened to drain liquid collected by the collection chamber.

The upper portion of the treatment vessel may be provided with a receptacle for receiving a growing medium. The receptacle may comprise a planting tray.

BRIEF DESCRIPTION OF THE DRAWINGS

For a better understanding of the present invention, and to show more clearly how it may be carried into effect, reference will now be made, by way of example, to the accompanying drawings, of which.

DETAILED DESCRIPTION

Figure 1:
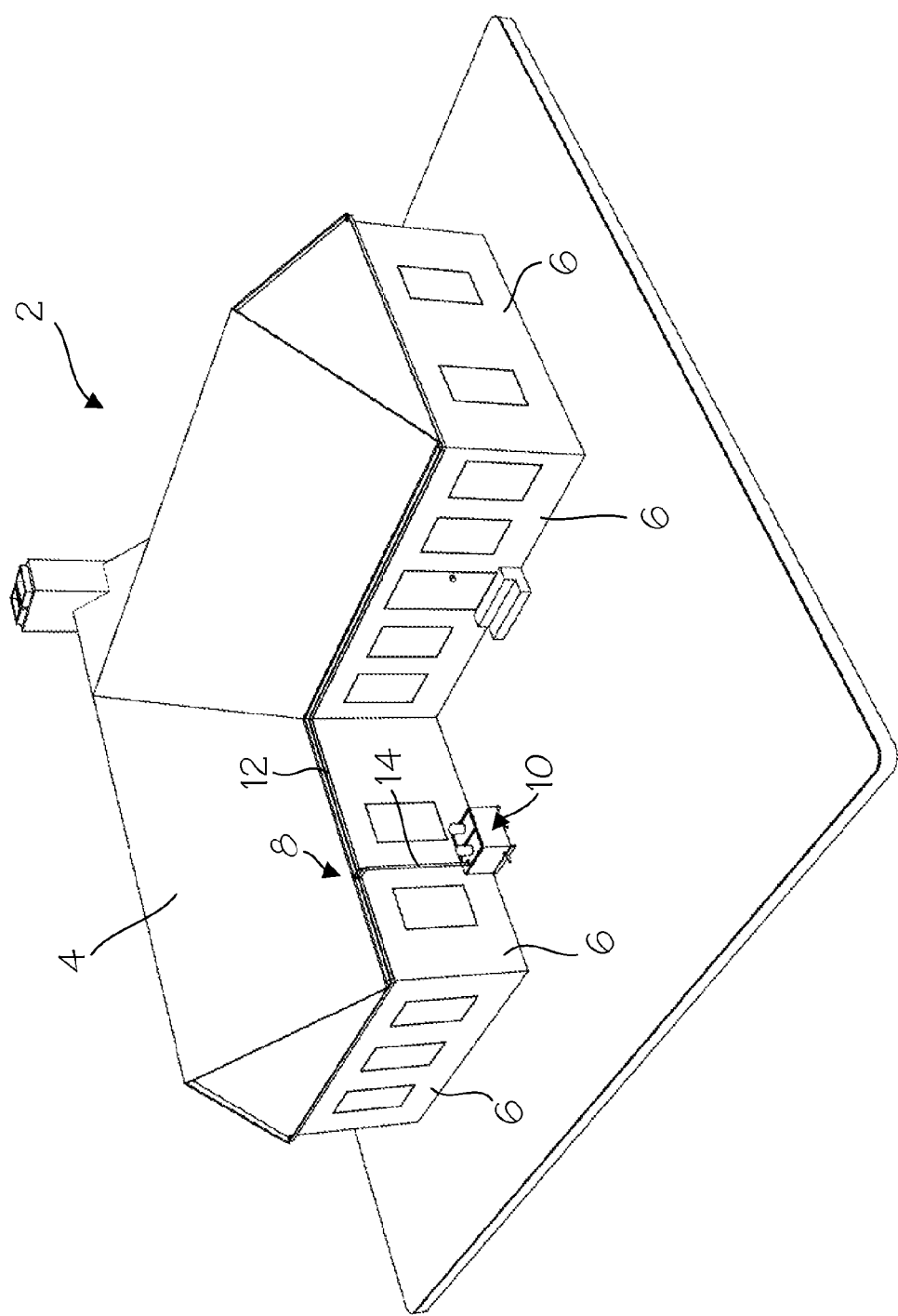
FIG. 1 is a schematic representation of a building provided with a drainage system and a treatment apparatus.
Figure 2:
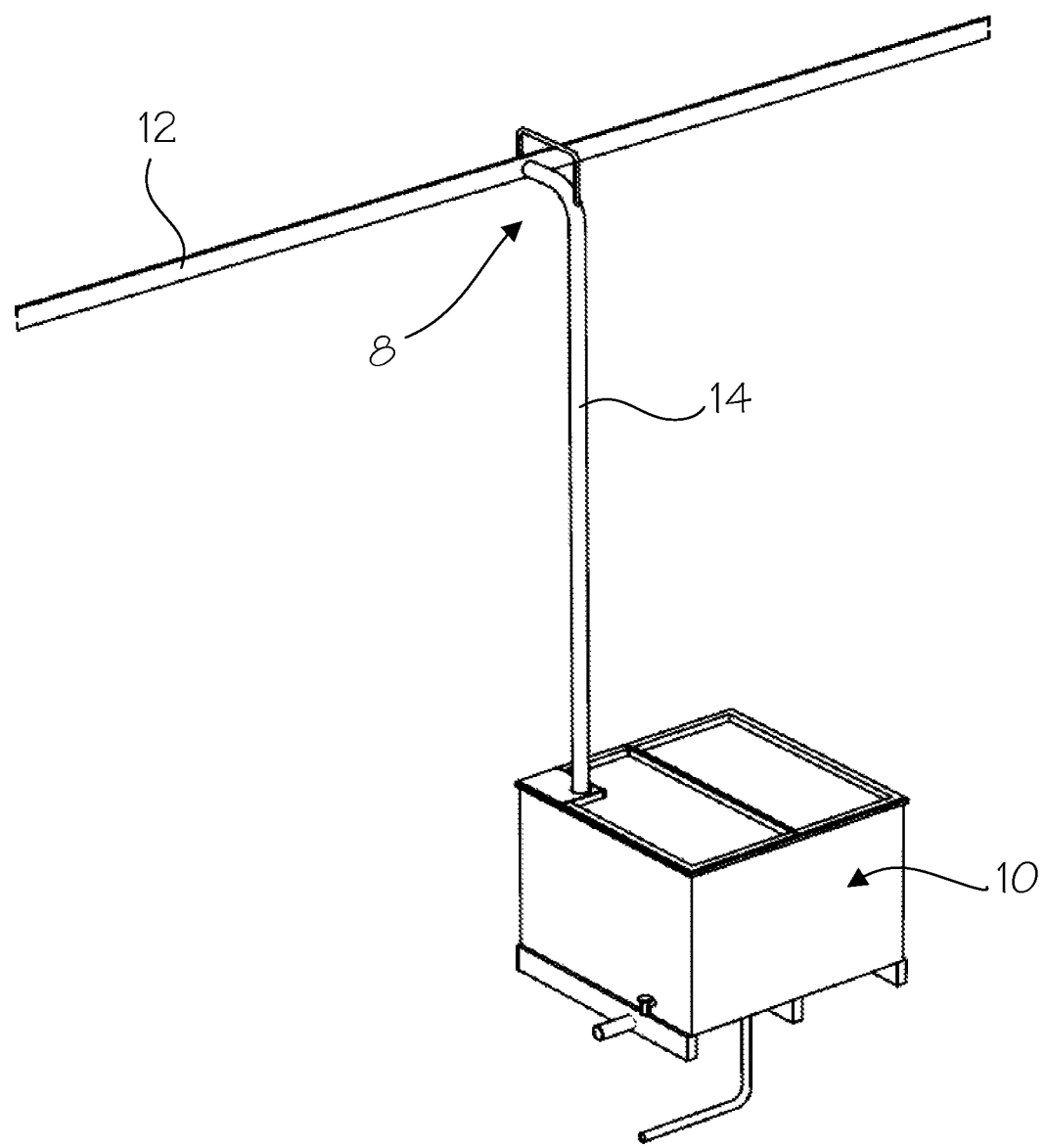
FIG. 2 is a schematic representation of embodiments of the drainage system and treatment apparatus shown in FIG. 1.

FIG. 1 shows a building 2, such as a house, comprising a roof 4 and sidewalls 6. The building 2 is provided with a drainage system 8 and a treatment apparatus 10 such as those shown in FIG. 2.

Figure 3:
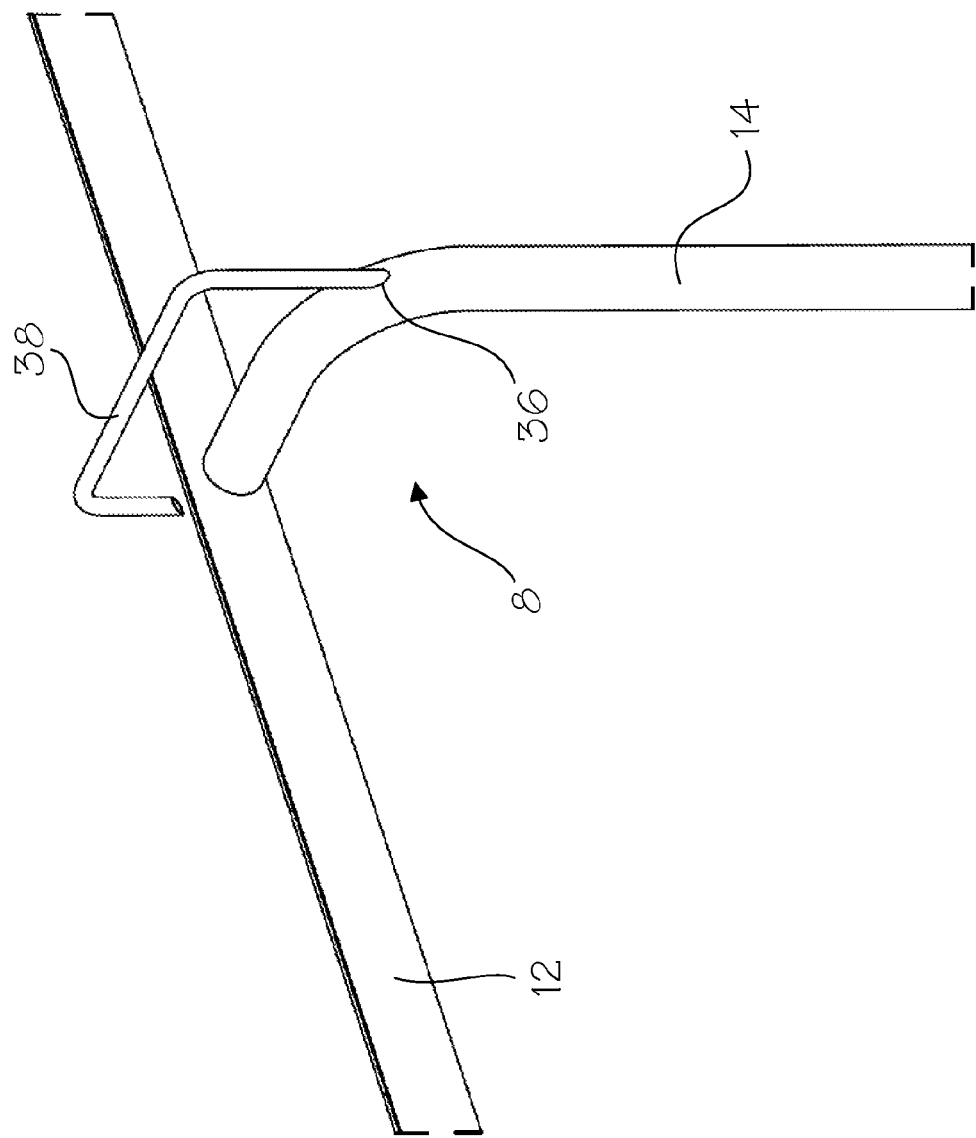
FIG. 3 is a schematic representation of part of the drainage system shown in FIG. 2.
Figure 4:
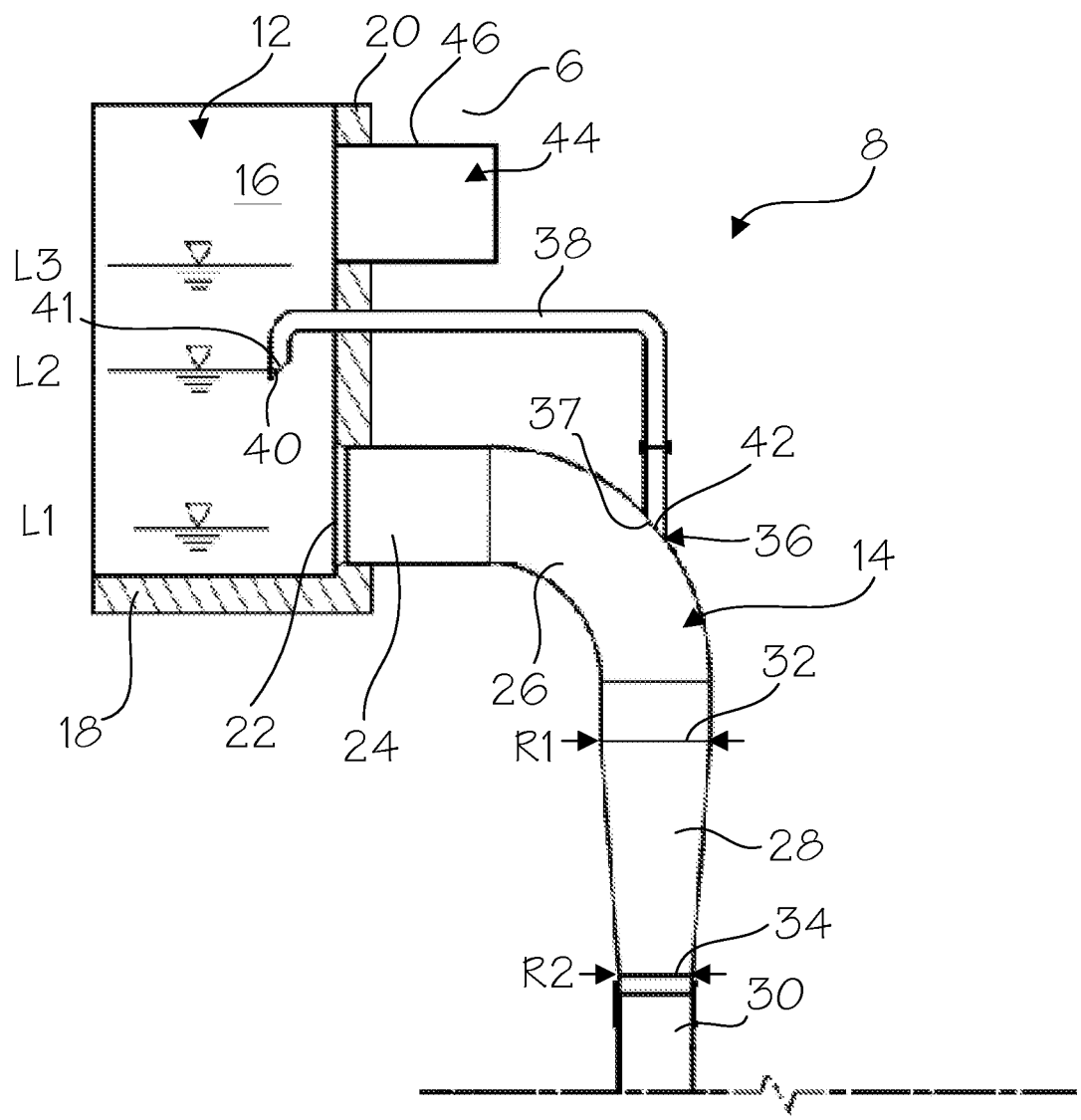
FIG. 4 is a schematic representation of an embodiment of the drainage system shown in FIG. 2.

FIGS. 3 and 4 show the drainage system 8 in more detail. The drainage system 8 comprises a collector in the form of an elongate gutter 12 and a drainage pipe in the form of a tubular downpipe 14.

The gutter 12 extends along the lower periphery of the roof 4, as shown in FIG. 1. The gutter 12 comprises a channel 16 defined by a lower wall 18, an outer sidewall 20 and an inner sidewall (not shown). The downpipe 14 comprises a pipe inlet 22 that opens into the channel 16 through the outer sidewall 20, thereby defining a channel outlet.

The downpipe 14 comprises an exit section 24, bend section 26, tapered section 28 and lower section 30. The exit section 24 extends away from the pipe inlet 22 in a horizontal direction and joins the bend section 26. The bend section 26 extends away from the exit section 24 and turns downwardly from the exit section 24 through approximately 90 degrees to join the tapered section 28. The tapered section 28 extends vertically downwardly from the bend section 26 to the lower section 30. The tapered section 28 tapers in the downward direction. The lower section 30 extends vertically downwardly from the bottom of the tapered section 28.

The exit section 24 and the bend section 26 have an internal diameter R1 which is larger than the internal diameter R2 of the lower section 30.

The tapered section 28 has an inlet portion 32 adjacent the bend section 26, which has an internal diameter that corresponds to the internal diameter of the bend section 26, and an outlet portion 34 adjacent the lower section 30, which has an internal diameter that corresponds to the internal diameter of the lower section 30. The tapered section 28 provides a constricting flow passage between the bend section 26 and the lower section 30.

The bend section 26 is provided with a vent 36 which is spaced away from the pipe inlet 22. The vent 36 comprises an aperture 37 through the wall of the bend section 26. The aperture 37 is located at a radially outer portion of the bend section 26 relative to the radius of curvature of the bend section 26. In the embodiment shown, the aperture 37 is level with the axial center of the pipe inlet 22 and the exit section 24. However, it will be appreciated that the aperture 37 may be offset from the axial center of the pipe inlet 22 and the exit section 24.

A vent duct 38, in the form of a tube, extends away from the vent 36. The vent duct 38 has a vent inlet 40 and a vent outlet 42. The vent outlet 42 is arranged such that the vent outlet 42 opens through the aperture 37 into an upper region of the bend section 26.

The vent duct 38 extends vertically upwardly from the vent outlet 42 before turning thorough 90 degrees towards the gutter 12. The vent duct 38 extends through the outer sidewall 20 into the channel 16 and turns downwardly through 90 degrees to the vent inlet 40. The vent inlet 40 comprises an aperture 41 at the end of the vent duct 38 which extends in a plane which is inclined at approximately 45 degrees to the horizontal. It will be appreciated that the plane in which the aperture 41 extends may be inclined at an angle between 0 and not more than 90 degrees. However, an angle of not less than 20 and not more than 70 degrees is preferred, for example an angle between 40 and 50 degrees. The vent inlet 40 is disposed above the top of the pipe inlet 22.

The vent 36 and vent duct 38 provide fluid communication between the downpipe 14 and the region of the channel 16 above the pipe inlet 22.

The gutter 12 is provided with an overflow 44 disposed above the vent inlet 40. The overflow 44 comprises a tube 46 which extends horizontally from the channel 16 through the outer sidewall 20.

Figure 5:
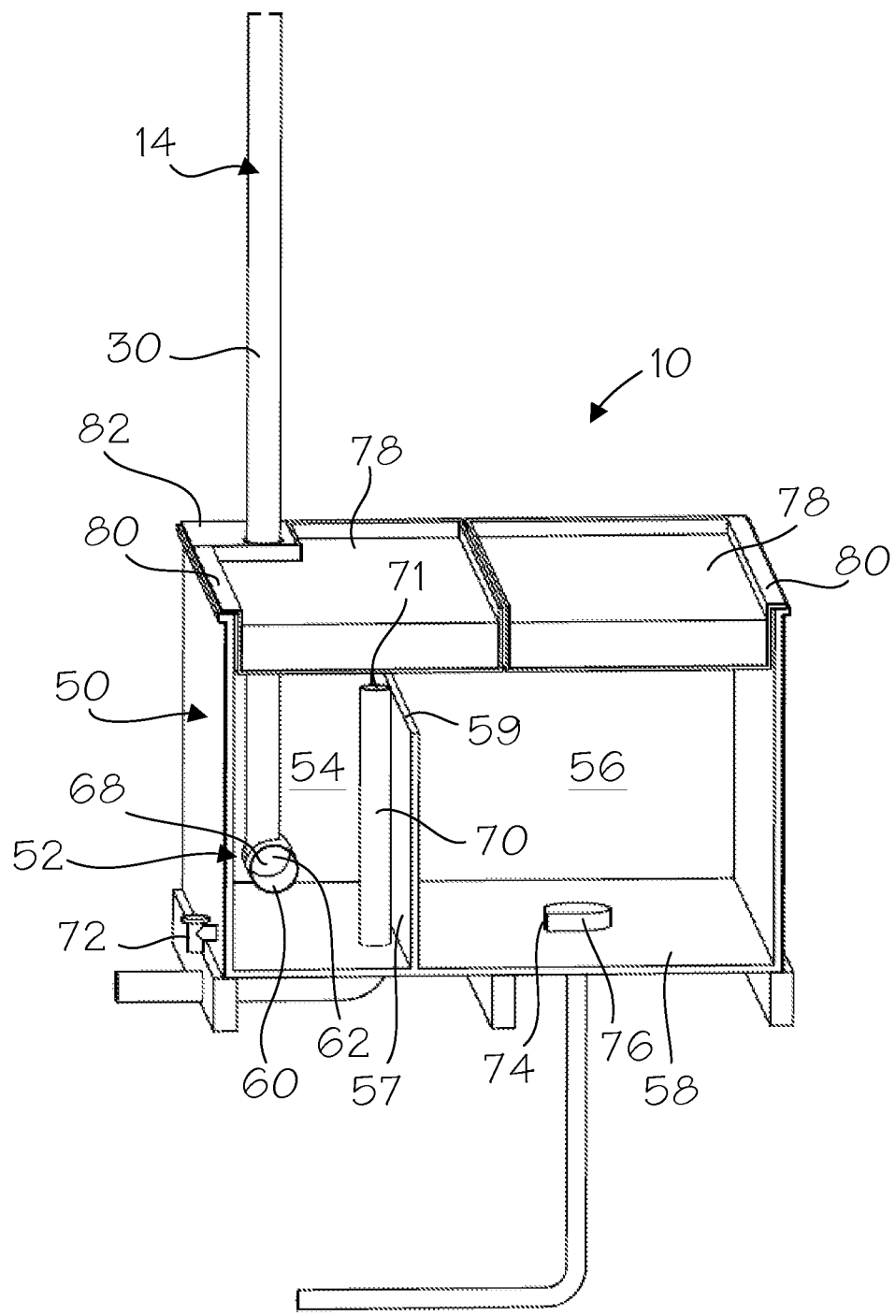
FIG. 5 is a schematic representation of an embodiment of the treatment apparatus shown in FIG. 2.

FIG. 5 shows the treatment apparatus 10. The treatment apparatus 10 comprises the lower section 30 of the downpipe 14, a treatment vessel 50 and an energy dissipater 52.

The treatment vessel 50 comprises a collection chamber 54 and a drainage chamber 56. The collection chamber 54 and the drainage chamber 56 are separated by a baffle 57 which extends upwardly from a base 58 of the treatment vessel 50. The top of the baffle 57 provides a weir 59 between the collection chamber 54 and the drainage chamber 56.

The energy dissipater 52 is disposed within the collection chamber 54.

The energy dissipater 52 comprises an open ended tube 60 which defines a substantially cylindrical dissipation chamber 62. A substantially cylindrical chamber 62 may have curved or planar wall sections provided that the chamber 62 is capable of sustaining rotational flow within the chamber 62. The tube 60 is arranged such that it extends horizontally within the collection chamber 54.

Figure 6:
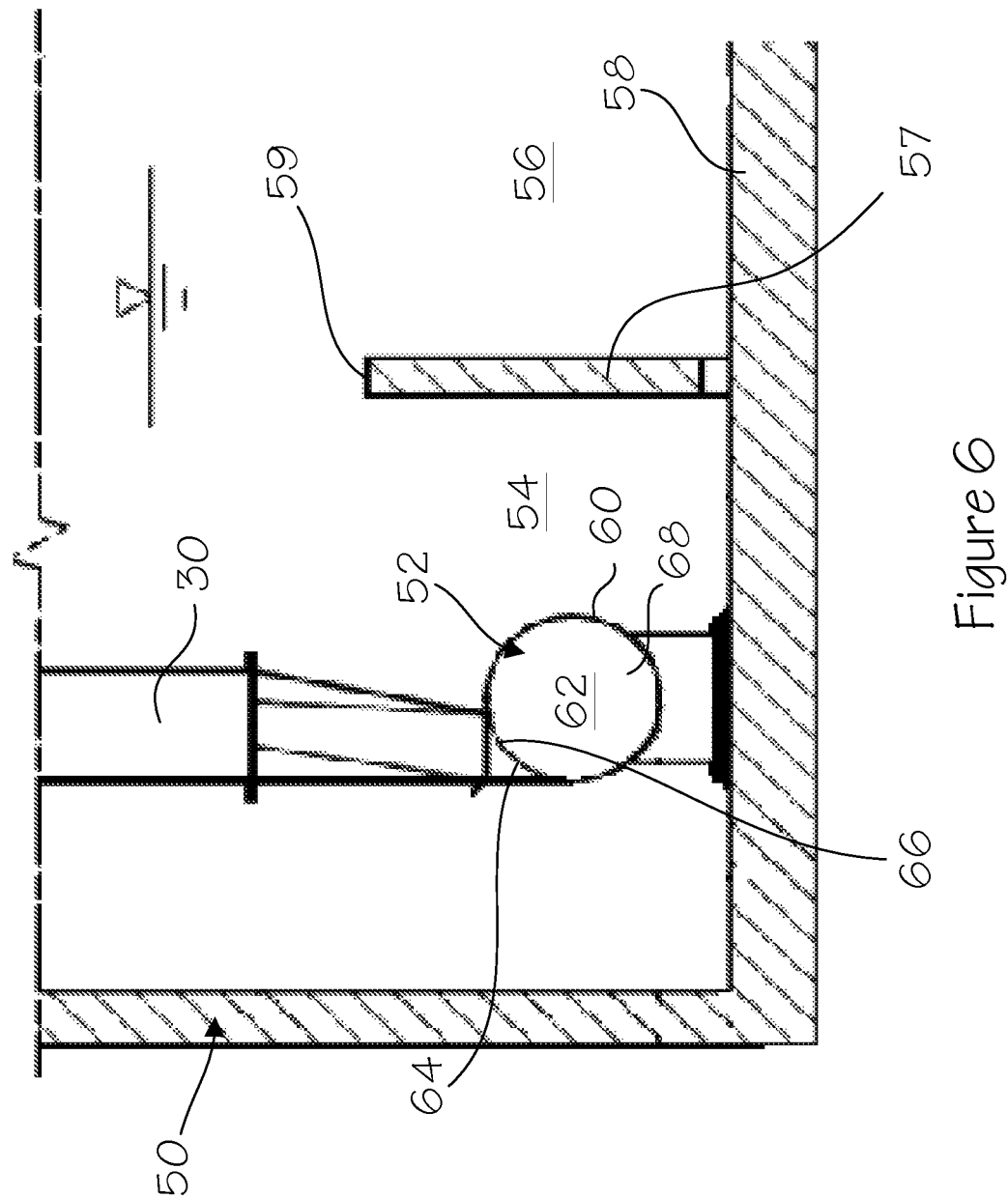
FIG. 6 is a schematic representation of part of the treatment apparatus shown in FIG. 5.

The tube 60 is fixed to the bottom of the lower section 30 of the downpipe 14 such that the energy dissipater 52 is in fluid communication with the downpipe 14. The energy dissipater 52 may be supported by the downpipe 14 and/or the base of the collection chamber 54. As shown in FIG. 6, the downpipe 14 comprises a downpipe outlet 64 at the bottom of the lower section 30.

The dissipation chamber 62 comprises a dissipater inlet 66 provided in the wall of the tube 60. The inlet 66 is located approximately midway along the length of the tube 60. The inlet 66 is arranged in fluid communication with downpipe outlet 64. The energy dissipater 52 is arranged with respect to the lower section 30 such that the longitudinal axis of the lower section 30 is perpendicular to, and offset from, the longitudinal axis of the tube 60. In the embodiment shown, the internal diameter of the lower section 30 of the downpipe 14 is greater than the internal radius of the dissipation chamber 62 and less than the internal diameter of the dissipation chamber 62. However, it will be appreciated that the internal diameter of the lower section 30 of the downpipe 14 and the internal radius of the dissipation chamber 62 may be sized according to requirements. The internal diameter of the lower section 30 of the downpipe 14 may therefore be less than the internal radius of the dissipation chamber 62.

The open ends of the tube 60 provide respective dissipater outlets 68 from the dissipation chamber 62. The outlets 68 open into the collection chamber 54.

As shown in FIG. 5, an overflow pipe 70 is disposed within the collection chamber 54. The overflow pipe 70 has an overflow outlet 71 above the level of the weir 59. The overflow outlet 71 provides a high level outlet from the treatment vessel 50.

A drain valve 72 is arranged at a lower region of the collection chamber 54. The drain valve 72 provides a second outlet from the treatment vessel 50. The drain valve 72 is manually operable between an open and closed condition.

A drain outlet 74 is provided in the drainage chamber 56. The drain outlet 74 provides a third outlet from the treatment vessel 50 through the base 58 of the treatment vessel 50. The drain outlet 74 comprises a vortex valve 76.

Planting trays 78 are located at the top of the treatment vessel 50. In the embodiment shown there are two trays 78. Each tray 78 comprises a peripheral lip 80 which latches on upper edges of the treatment vessel 50 such that the planting trays 78 are suspended above the collection and drainage chambers 54, 56. The planting trays 78 cover the treatment vessel 50 to prevent debris from falling into the chambers 54, 56. Plants and other types of growing medium can be disposed in the planting trays 78.

The downpipe 14 may extend through a tray 78, or, as shown in the FIG. 5, through a separate cover section 82 so that removal of the trays 78 is not impeded by the downpipe 14.

In use, rainwater (i.e. a liquid) which falls on the roof 4 collects in the channel 16 of the gutter 12. Water which collects in the channel 16 flows along the channel 16 and drains through the pipe inlet 22 of the downpipe 14. The water flows from the pipe inlet 22 through the exit section 24, bend section 26, tapered section 28 and down the lower section 30. The water flows out of the downpipe outlet 64, through the dissipater inlet 66 and into the dissipation chamber 62 of the energy dissipater 52. During normal use the collection chamber 54, within which the energy dissipater 52 is disposed, is flooded so as to submerge the dissipater 52. The collection chamber 54 may be flooded prior to use, or may be flooded by the initial flow of water collected by the drainage system 8 into the collection chamber 54.

The height of the downpipe inlet 22 above the energy dissipater 52, coupled with the substantially vertical drop through the lower section 30 of the downpipe 14 means that water exiting the downpipe outlet 64 has a significant amount of kinetic energy, and exits the downpipe outlet 64 at a high velocity.

The tangential arrangement of the lower section 30 of the downpipe 14 and the dissipater inlet 66 with respect to the dissipation chamber 62 generates rotational flow of water within the chamber 62. The rotational flow dissipates the kinetic energy of the flow within the dissipation chamber 62 and reduces the rotational velocity of the water. In addition, the rotational flow within the chamber 62 produces a vortex within the chamber 62. The vortex throttles flow through the downpipe outlet 64 so that the energy dissipater provides a hydraulic brake which acts on water flowing through the downpipe 14.

As the water flows rotationally within the dissipation chamber 62 it also flows in the axial direction away from the dissipater inlet 66 towards each of the outlets 68. The rotational flow, and hence kinetic energy, of the water within the dissipation chamber decreases towards the outlets 68 such that water exits the dissipation chamber 62 into the collection chamber 54 with substantially less kinetic energy than it had when exiting the downpipe 14. The amount of disturbance within the collection chamber 54 is therefore substantially less than it would be if the downpipe outlet 64 opened directly into the collection chamber 54.

Water accumulates within the collection chamber 54 up to the level of the weir 59, before flowing over the weir 59 into the drainage chamber 56. Some of the water also flows through the overflow outlet 71 of the overflow pipe 70. Water that flows into the drainage chamber 56 drains through the drain outlet 74. The vortex valve 76 controls the flow rate from the drainage chamber 56.

During conditions in which there is a low rate of flow of water into the channel 16, for example when there is light rainfall, the level of water within the channel 16 remains below the top of the pipe inlet 22. This is indicated, by way of example, by level L1 in FIG. 4.

As the flow rate into the channel 16 increases, for example as a consequence of heavy or prolonged rainfall, the level of water within the channel 16 rises above the level of the vent 36. Water flowing across the vent 36 draws air through the vent 36 into the flow. The air is entrained within the downward flow through the bend section 26. The water and air are funneled downwardly by the tapered section 28 into the lower section 30 of the downpipe 14. The tapered section 28 provides a transition between the larger diameter bend section 26 and the smaller diameter lower section 30. The water and air drain through the dissipater 52 into the collection chamber 54 as described above.

As the level of water within the channel rises further above the top of the pipe inlet 22, air continues to be drawn through the vent 36 into the downpipe 14. When the pipe inlet 22 is occluded, the amount of air drawn into the downpipe 14 is only that which is drawn through the vent.

As the level of water rises above the vent inlet 40, indicated by level L2 in FIG. 4, the water progressively occludes the inclined aperture 41. The amount of air drawn into the downpipe 14 through the vent 36 is therefore reduced by the gradual occlusion of the vent inlet 40. This creates a self-leveling adjustment to match the incoming flow rate. Once the level of the water within the channel 16 has risen above the vent inlet 40, indicated by level L3 in FIG. 4, no air is drawn into the downpipe 14. The drainage system 8 is then in a full liquid flow mode.

The progressive reduction of the amount of air which is drawn into the downpipe 14, by limiting the amount of air drawn into the downpipe 14 to that which is drawn through the vent 36 from the vent inlet 40, provides a generally smooth transition from an air-entrained mode to the full liquid flow mode.

A further rise in the level of water within the channel 16 to the level of the overflow 44, for example during extreme rainfall, causes water to flow out of the channel 16 through the tube 46 of the overflow 44.

It will be appreciated that in alternative embodiments the vent duct need not be in direct fluid communication with channel, for example the vent duct may extend vertically upward to a vent inlet directly above the downpipe.

It will be appreciated that the pipe inlet may be arranged such that it opens through the lower wall (i.e. floor) of the channel. In such an embodiment, the downpipe may be arranged to extend vertically downwardly from the channel.

It will be appreciated that the rainwater processed by the drainage system and the treatment apparatus may comprise pollutants which may be treated in the treatment apparatus 10.

Figure 7:
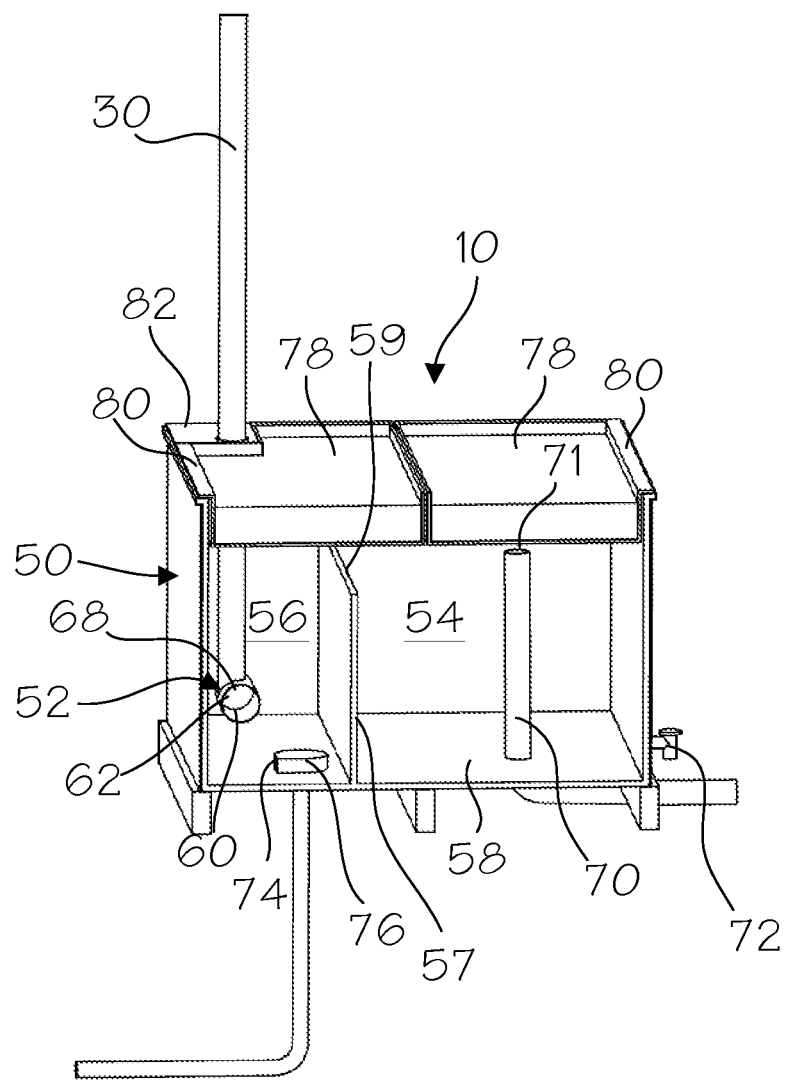
FIG. 7 is a schematic representation of a further embodiment of a treatment apparatus.

FIG. 7 shows an alternative embodiment of the treatment apparatus 10 in which the energy dissipater 52 is disposed within the drainage chamber 56. The drain outlet 74 is disposed within the drainage chamber 56. The overflow pipe 70 is disposed within the collection chamber 54. The overflow outlet 71 provides a high level outlet from the treatment vessel 50. In this embodiment, water which is discharged from the dissipater 52 into the drainage chamber 56 drains from the drainage chamber 56 through the drain outlet 74. If the rate of flow into the drainage chamber 56 exceeds the flow capacity of the drain outlet 74, the level of water within the drainage chamber 56 rises and flows over the weir 59 into the collection chamber 54. Water can be stored in the collection chamber 54, and can be discharged from the treatment vessel 50 via the drain valve 72. If the level of water within the collection chamber 54 rises above the level of the overflow outlet 71, it is discharged from the treatment vessel through the overflow pipe 70.

In an alternative embodiment, the collection chamber 54 and/or the baffle 57 may be dispensed with such that the treatment apparatus 10 comprises a single chamber.

Figure 8:
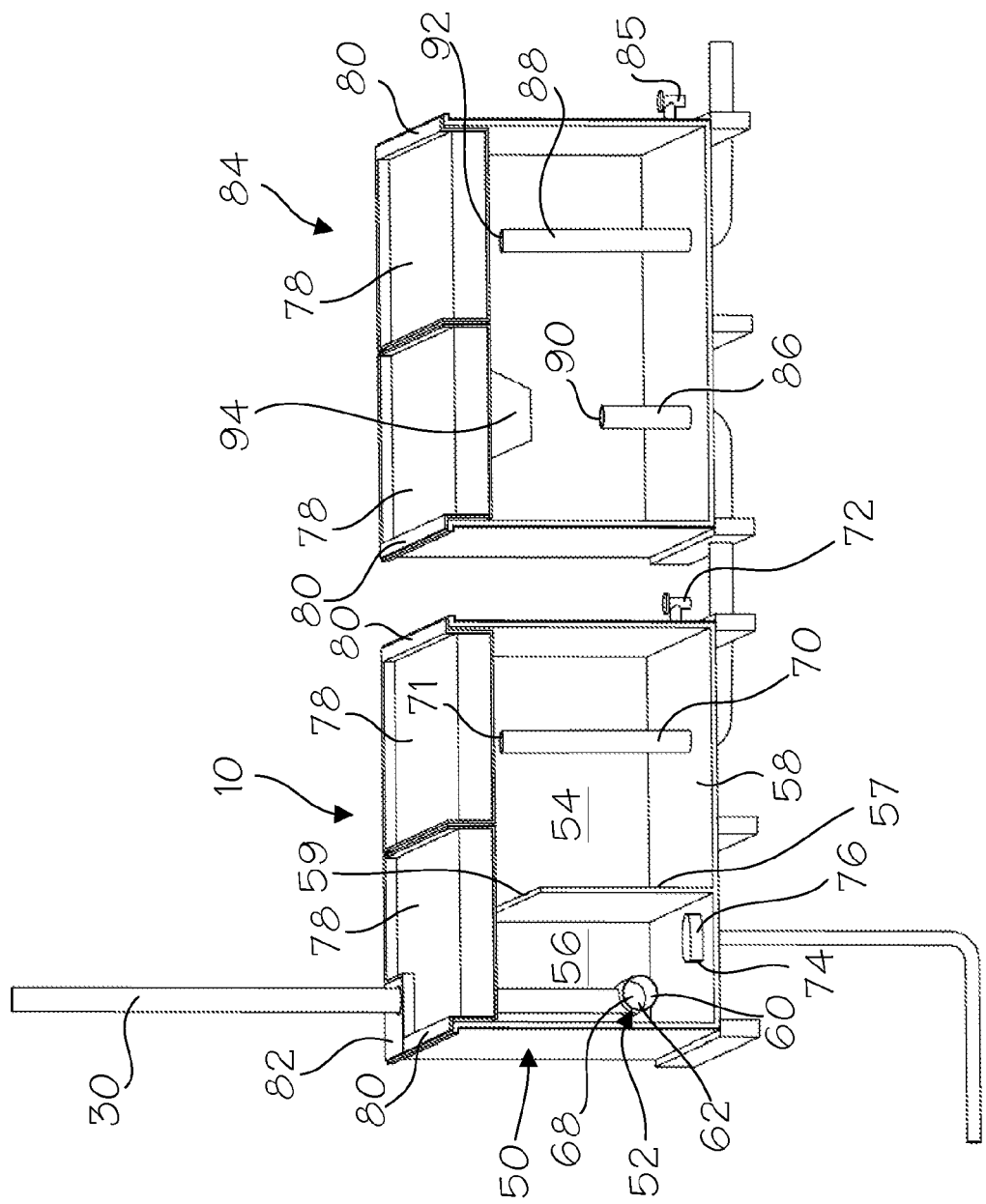
FIG. 8 is a schematic representation of a system comprising the embodiment shown in FIG. 7.

FIG. 8 shows a system comprising the treatment apparatus 10 shown in FIG. 7. One or more optional storage tanks 84 are connected to the collection chamber 54 via the overflow pipe 70 for receiving water from the collection chamber 54 when the level of water within the collection chamber 54 rises above the overflow outlet 71 of the overflow pipe 70. The storage tanks 84 comprise an inlet pipe 86 and an outlet pipe 88. The inlet pipe 86 has an inlet 90 disposed below an outlet 92 of the outlet pipe 88. The inlet pipe 86 is provide in fluid communication with the overflow pipe 70 of the treatment apparatus. A drain valve 85 is disposed at the lower region of the storage tank 84 for draining water from the storage tank 84.

FIG. 8 shows one of the plant trays 78 having an optional wicking element 94 for drawing water from the storage tank 84 into the tray 78. It will be appreciated that some or all of the trays 78 in each of the embodiments may be provided with a wicking element 94.

The invention claimed is:

1. A drainage system, comprising:
 a collector which is arranged to collect liquid;
 a drainage pipe having a pipe inlet that opens into the collector such that liquid collected by the collector drains through the pipe inlet, wherein the drainage pipe is provided with a vent spaced away from the pipe inlet, the vent being arranged such that, when liquid collected by the collector occludes the pipe inlet, liquid flowing through the drainage pipe draws air into the drainage pipe through the vent,
 a vent duct which extends away from the vent, the vent duct having a vent inlet arranged to draw air from a level above the pipe inlet during normal use, and a vent outlet which opens into the drainage pipe through the vent,
 wherein the vent inlet is arranged to open into the collector,
 wherein the vent inlet is arranged such that in use, a threshold level of liquid which accumulates within the collector inhibits flow of air through the vent inlet, and
 wherein a portion of the vent duct extends downwardly to the vent inlet.

2. A drainage system as claimed in claim 1, wherein the vent inlet comprises an aperture which is located in a plane inclined to the horizontal such that flow of air through the vent inlet is progressively inhibited as the level of liquid within the collector rises over the aperture.

3. A drainage system as claimed in claim 1, wherein the collector comprises an overflow disposed at a level above the vent.

4. A drainage system as claimed in claim 1, wherein the drainage pipe comprises a downpipe having a downwardly extending portion.

5. A drainage system as claimed in claim 4, wherein the downpipe comprises a tapered portion which is arranged to taper in the direction away from the pipe inlet.

6. A drainage system as claimed in claim 4, wherein the downpipe further comprises a substantially longitudinally extending exit portion disposed between the pipe inlet and the downwardly extending portion.

7. A drainage system as claimed in claim 4, wherein the drainage pipe comprises a curved portion disposed between the pipe inlet and the downwardly extending portion, wherein the vent is disposed at the curved portion.

8. A drainage system as claimed in claim 1, wherein the pipe inlet is arranged to open into the collector through a sidewall of the collector.

9. A drainage system as claimed in claim 1, further comprising an energy dissipater, the energy dissipater being disposed in fluid communication with the drainage pipe.

10. A drainage system as claimed in claim 1, wherein the collector comprises a longitudinally extending gutter.

11. A building comprising a drainage system as claimed in claim 1, wherein the collector is arranged to collect runoff from the building.

* * * * *